Patented Jan. 23, 1923.

1,443,180

UNITED STATES PATENT OFFICE.

LAWRENCE J. HENDERSON, OF CAMBRIDGE, MASSACHUSETTS.

FOOD COMPOSITION.

No Drawing. Application filed July 13, 1920. Serial No. 395,931.

*To all whom it may concern:*

Be it known that I, LAWRENCE J. HENDERSON, a citizen of the United States, and resident of Cambridge, in the county of Middlesex and State of Massachusetts, have invented new and useful Improvements in Food Compositions, of which the following is a specification.

This invention relates to a food composition for cooking and more particularly to a desiccated mixture for use in making bread and cake and other foods involving a rising dough.

The object of the invention is to produce a cooking composition which affords uniform results in preparing food of the character referred to, which requires a minimum of skill to produce good results and which is convenient in use and low in cost.

In order that bread, cake, etc., shall rise properly and maintain approximately the maximum volume during and after baking or cooking, it is essential that an adequate amount of carbon dioxide shall be liberated, that this shall be retained in sufficient quantity, and that proteins shall be present in such quantity and shall be so coagulated during baking or cooking that a sensible diminution in volume thereafter is impossible.

Both the retention of gas during preparation and cooking and the maintenance of the volume thereafter depend upon the nature and the chemical and physical state of the proteins. With ordinary baking powder the state of the protein is uncertain, since it depends upon both the character of the flour and other ingredients, and the character and amount of baking powder employed. Moreover all flours, even including the best wheat flour, contain an insufficient quantity of proteins to make possible the maximum volume of a given quantity of material. Hence with ordinary baking powders uniform results are impossible, failures are not infrequent, and maximum volume is not attainable without the addition of very expensive material (eggs) in amounts which are not easily predetermined.

When wheat flour is one of the principal ingredients, the best results are obtained by baking when the hydrogen ion concentration of the dough is approximately 0.00001 normal. Under all circumstances the hydrogen ion concentration is the most important factor in modifying the state of the proteins before, during, and after cooking. With all baking powders now on the market the hydrogen ion concentration can not be controlled and is left to chance. Upon this fact depends the superiority of yeast to baking powder, since yeast and organisms which accompany it produce acid during fermentation; and the skillful cook has learned to terminate the process when the optimum hydrogen ion concentration has been attained (judging by the consistency of the dough.)

The addition to ordinary baking powder (whether tartrate, or phosphate, or any other) of about one-half its bulk of an albumin or globulin or both (such as may be obtained by the desiccation of blood serum) brings about, in any case, much greater uniformity in the reaction of mixtures obtained with such baking powder, since the "buffer action" of the protein added controls in a large measure the reaction of the mixture and thus the chemical combination of acid with the proteins. This is even more the case when larger quantities of protein are employed, as may be desirable either to reduce to a minimum the mount of baking powder required (this is reduced in any case by the addition of albumin or globulin) or because the quantity of gluten in the other materials is deficient.

Thus the addition of dry blood serum to a baking powder results in, first, a more exact control of the physical state of the proteins of the dough and hence more uniform results, especially as a result of the control of the hydrogen ion concentration, through the "buffer action" of the serum proteins (a chemical combination) and secondly, a reduction in the necessary amount of baking powder to produce a given degree of lightness.

Moreover by adjusting the relative quantities of acid, base, and protein in such a baking powder mixture, any desired hydrogen ion concentration of the dough or other mixture may be assured, since with a considerable amount of protein in the baking powder the reaction can not be greatly modified by the ordinary constituents of flour or the other constituents of breads and cakes. In this manner a definite chemical combination and physical state of the proteins both before and after coagulation may be assured.

The desired hydrogen ion concentration may be attained either by bringing the blood serum to the desired reaction (by converting sodium bicarbonate, etc., into sodium chloride, before evaporation, or more simply by accurately adjusting the relative quantities of acid and base of the baking powder proper so that just the necessary excess of the acid constituent shall be present.

A preferred form of the composition may be composed of—

| | Grams. |
|---|---|
| Sodium bicarbonate | 514 |
| Acid potassium tartrate | 1486 |
| Desiccated ox serum | 1000 |

The relative quantities of acid and base of the baking powder should be approximately in the ratio 7:6 (chemical equivalents).

The proteins of milk or buttermilk are without sensible effect to increase the rising since they do not provide an adequate coagulum. In the case of buttermilk the variable acidity of the product offsets the "buffer action" of the constituent proteins and as a result there is no noticeable tendency to obtain uniform hydrogen ion concentrations.

The invention may be generalized as comprising the use for cookery of a mixture containing acids and bases and soluble coagulable proteins in such proportions that after an adequate evolution of carbon dioxide there shall remain a mixture in which the chemical combination of the proteins in question and also of gluten with acids and bases shall correspond to the desired hydrogen ion concentration, and in which there shall be so much protein that the leavening effect is a maximum for a minimum of carbon dioxide evolved. This may be obtained by adding to the usual cereal flours employed in cooking a mixture of approximately one-third desiccated blood serum and two-thirds baking powder in which the acid-base ratio is adapted to yield the necessary hydrogen ion concentration, at least approximately of the order of .00001 normal and possibly as high as approximately .00005 normal.

I claim:

1. A composition for cookery comprising an acid-base ingredient and soluble coagulable protein proportioned to produce an hydrogen ion concentration at least of the order of approximately .00001 normal after an adequate evolution of $CO_2$ incident to the chemical combination of the proteins with the acid-base ingredient.

2. A desiccated mixture for cookery comprising an acid-base ingredient and soluble desiccated blood serum, the ingredients being proportioned to produce, when chemically combined with an ingredient containing gluten, an hydrogen ion concentration at least of the order of approximately .00001 normal after an adequate evolution of $CO_2$.

3. A composition for cookery comprising a comminuted mixture of baking powder and desiccated soluble blood serum in which the baking powder exceeds the blood serum in quantity.

4. A composition for cookery comprising a comminuted mixture of baking powder and desiccated soluble blood serum in which the quantity of baking powder is approximately double the quantity of blood serum.

5. A mixture for cookery comprising baking powder and desiccated soluble coagulable protein proportioned to produce a predetermined hydrogen ion concentration after an adequate evolution of carbon dioxide incident to the chemical combination of the ingredients.

6. A desiccated compound for addition to a cooking mixture containing flours deficient in protein content, comprising soluble coagulatable blood serum in quantity sufficient to enrich such mixture in protein to an extent sufficient to insure maximum volume in cooking.

7. A food composition comprising a gas evolving ingredient, a cereal flour containing an inadequate amount of coagulatable protein to insure maximum retention of gas in cooking, and soluble desiccated coagulatable blood serum in quantity sufficient to insure substantial maximum volume of the mixture in cooking.

Signed by me at Boston, Mass., this sixteenth day of June, 1920.

LAWRENCE J. HENDERSON.